United States Patent [19]

Sarkissian

[11] Patent Number: 5,544,620
[45] Date of Patent: Aug. 13, 1996

[54] SELF-CLEANING CAT BOX

[76] Inventor: Geoffrey Sarkissian, 28592 Markuson Rd., Modjeska, Calif. 92676

[21] Appl. No.: 446,902

[22] Filed: May 17, 1995

[51] Int. Cl.⁶ .................................................. A01K 29/00
[52] U.S. Cl. ......................................................... 119/166
[58] Field of Search .................................. 119/162, 163, 119/166, 164; 209/235, 261

[56] References Cited

U.S. PATENT DOCUMENTS

| | | | |
|---|---|---|---|
| 4,190,525 | 2/1980 | Menzel | 209/235 |
| 4,493,288 | 1/1985 | Van Der Kolk | 119/166 X |
| 4,574,735 | 3/1986 | Hohenstein | 119/163 |
| 4,854,267 | 8/1989 | Morrow . | |
| 4,886,014 | 12/1989 | Sheriff . | |
| 4,897,183 | 1/1990 | Lewis, Jr. et al. | 119/161 X |
| 4,934,317 | 6/1990 | Pourshalchi . | |
| 5,048,464 | 9/1991 | Shirley | 119/166 |
| 5,048,465 | 9/1991 | Carlisi | 119/166 |
| 5,178,099 | 1/1993 | Lapps et al. | 119/166 |
| 5,226,388 | 7/1993 | McDaniel | 119/166 |
| 5,259,340 | 11/1993 | Arbogast | 119/166 |
| 5,267,530 | 12/1993 | Zamoyski | 119/166 |
| 5,272,999 | 12/1993 | Nussle | 119/166 |
| 5,279,258 | 1/1994 | Kakuta | 119/163 |
| 5,365,883 | 11/1994 | Laviolette | 119/170 |
| 5,477,812 | 12/1995 | Waters | 119/163 |

Primary Examiner—Robert P. Swiatek
Assistant Examiner—Yvonne Abbott

[57] ABSTRACT

An improved self cleaning cat box and new method for cleaning a cat litter box is comprised of a litter tray, a rake, and a storage area with a lid, a scraper and a drawer. In operation, a motor propels the rake through the litter. The rake collects waste as it moves forward till it is rotated up and moved over the storage area. The scraper comes down over the waste while the rake is over the storage area, preventing waste from leaving the storage area as the rake retracts. The waste is deposited in the drawer. When waste has accumulated, the drawer may be opened for easy maintenance. The storage area lid has a seal to prevent the escape of unpleasant odors. As the rake returns to its starting position, it back rakes and levels the litter. The rake is then retracted out of the litter and parked behind a baffle.

19 Claims, 4 Drawing Sheets

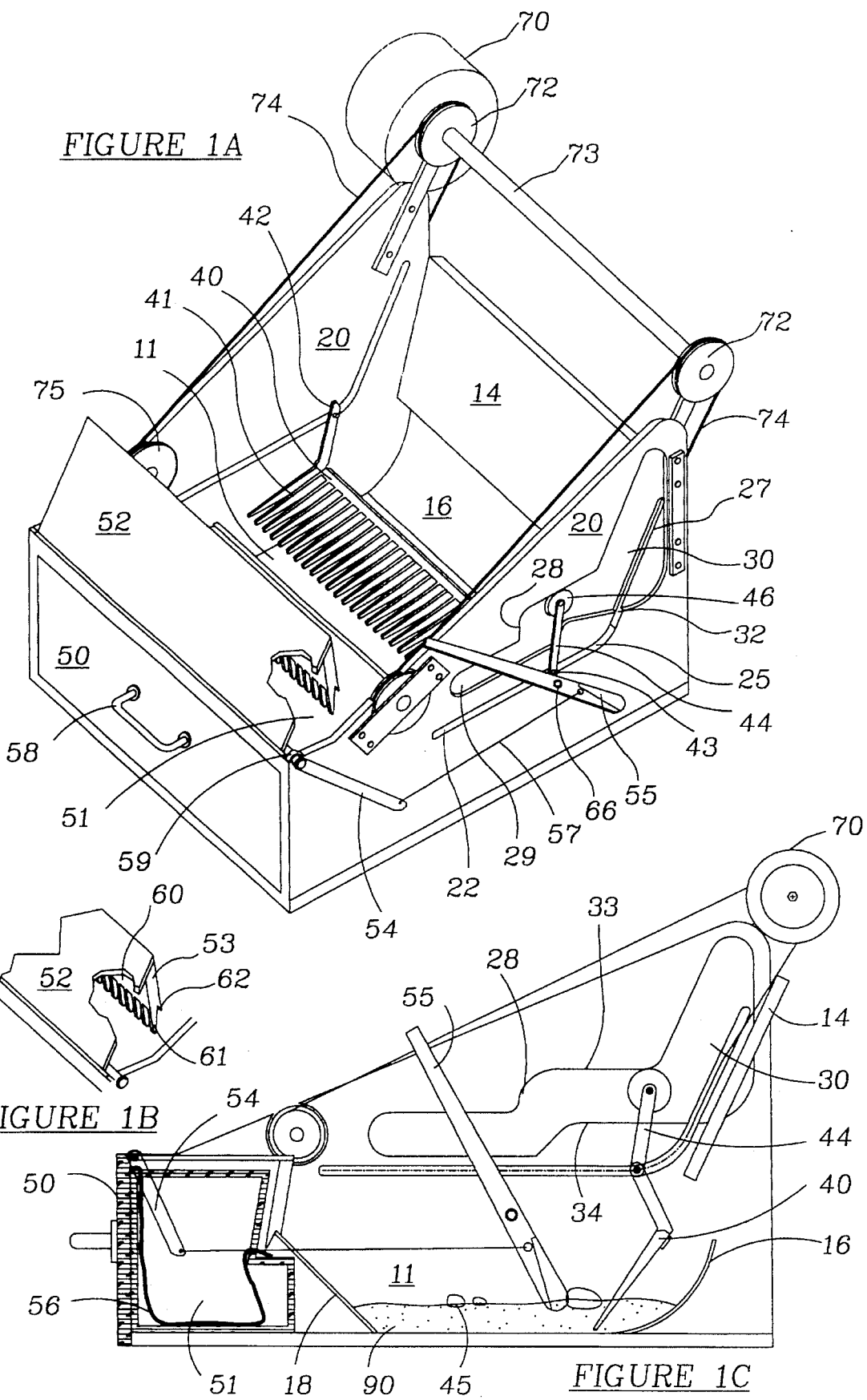

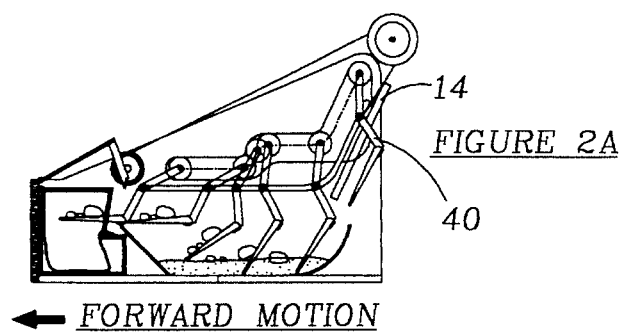
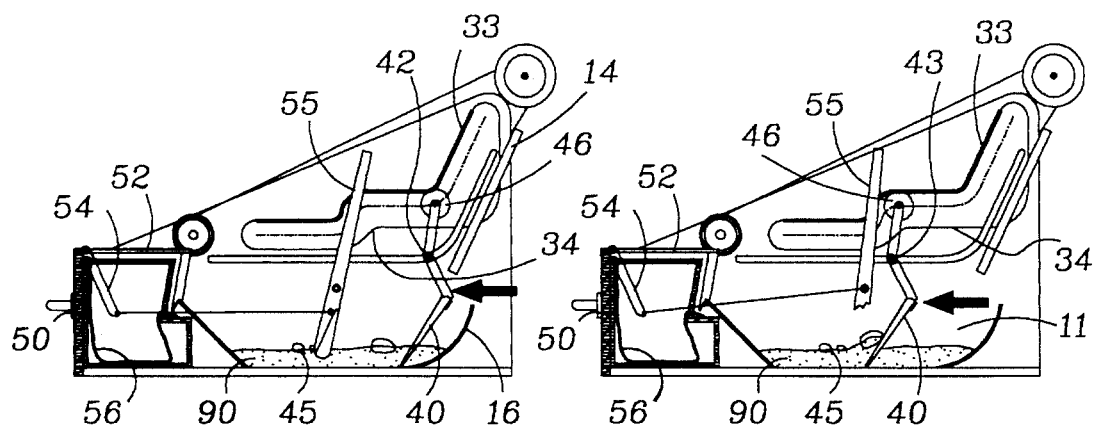
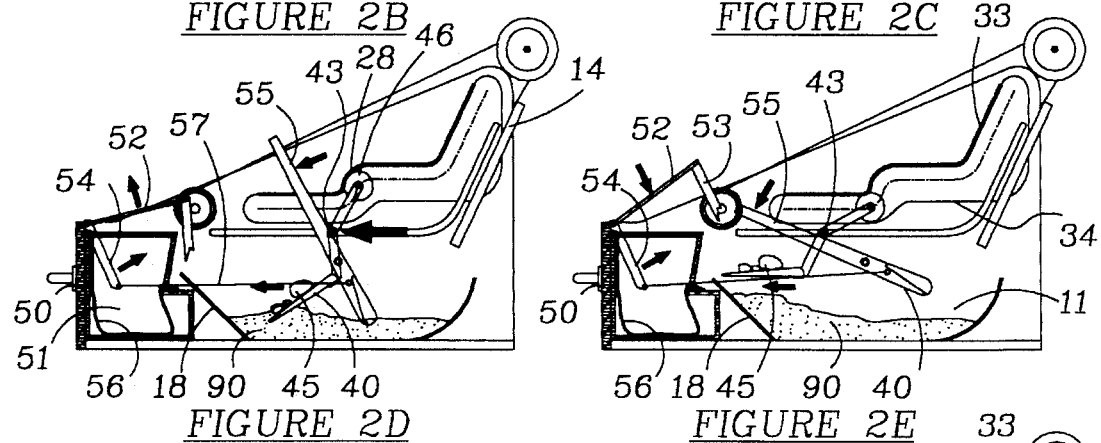
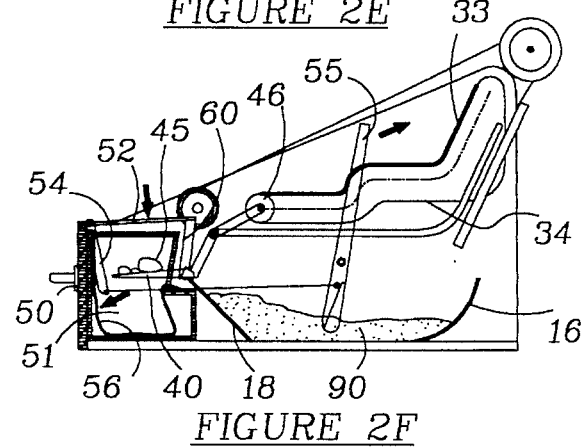

FORWARD

FIGURE 4D    BACKWARD

SELF-CLEANING CAT BOX

BACKGROUND—FIELD OF INVENTION

This invention relates to an automated device and method for the cleaning of cat litter boxes.

BACKGROUND—DESCRIPTION OF PRIOR ART

The cleaning of the cat box is an unpleasant and time consuming chore for the cat owner. Consequently, inventors have sought ways to eliminate or automate this disagreeable task. Numbers patents have been granted for various cat box designs. Most of these have been for manual systems such as U.S. Pat. Nos. 5,365,883 granted to Laviolette (1994); 5,272,999 granted to Nussle (1993); 4,886,014 to Sheriff(1989) and 4,854,267 to Morrow (1989). No automated system has found acceptance in the marketplace.

Pourshalchi (1990) in U.S. Pat. No. 4,934,317 discloses a mechanical cat box in which a curved litter tray is moved past a scraper. The scraper removes both waste and all litter that was in the tray. A hopper then automatically refills the tray for subsequent usage by the cat. No provision is made for separating the soiled litter and waste from the clean litter. A disadvantage of this design is that large amounts of clean litter are wasted with each cleaning cycle.

Shirley (1991) in U.S. Pat. No. 5,048,464 discloses a self-cleaning litter system in which a helical shaped screen is fastened in a large cylindrical chamber. The entire chamber is rotated by a motor. As the chamber rotates, waste is separated from the litter and moved forward by action of the helical screen. This design has several disadvantages. First the helical screen is left in the litter at all times, giving the cat opportunity to defecate directly on the screen. Second, the softer dumps will crumble while being tumbled, and much of the waste will not make it into the storage container. Third, the screen will be eventually clogged by waste, as there is no provision for cleaning the screen after usage.

U.S. Pat. 4,190,525 to Menzel (1980) discloses a cat box with a sifting screen which is rotated through the litter to remove the waste clumps. No provision is made for storing waste, and the screen must be manually emptied after each usage. U.S. Pat. No. 5,267,530 to Zamoyski (1993) disclosed a rectangular basket that is pulled through the litter by means of chains and sprockets. U.S. Pat. No. 5,259,340 granted to Arbogast (1993) discloses a sifting screen rotated through a 360 degree arc, moving with sufficient velocity to throw the waste into a storage compartment. These cat boxes based on a circular design suffer from a common disadvantage. Cat litter is highly abrasive and sticky when wet. A rake or scoop fine enough to sift out small clumps will push all the litter in the direction of the scoop travel. Thus, after one or two cleaning cycles all of the litter is moved to one end of the box, and the other end is exposed to defecation. Another disadvantage is that no provision is made for cleaning the scoop or screen to which clumps will stick. The screens would eventually become clogged with waste.

Carlisi (1991) in U.S. Pat. No. 5,048,465 and McDaniel (1993) in U.S. Pat. No. 5,226,388 disclose linear types of cat boxes. A rake is moved through the litter, rotated up, and moved over a storage area. The rake is then rotated downward to allow the clumps to fall into a storage container. Following the dumping of waste, the rake is retracted along the same path.

These linear type of designs suffers from several disadvantages. First, as with the circular designs, during forward motion of the rake all of the litter is moved forward. After several cycles, the tray bottom at the rear of the cat box is exposed for the cat to defecate on. No provision is made to re-level the litter. Second, when the rake rotates downwards to dump the waste, the rake's arc passes through a large area, substantially limiting the space available for waste storage. Finally, no provision is made to clean the rake of the small waste clumps that will stick between the rake tines regardless of how steeply the rake slants.

Carlisi (1991) in U.S. Pat. No. 5,048,465 further discloses that when the rake retracts to its initial position, it stays on top of the litter. A disadvantage of this design is that it allows the cat to defecate directly on the rake. Space needed for the cat is taken up by the rake. Further, because litter is moved only in a forward direction, clean litter piles up near the lip of the storage compartment. With each subsequent cleaning cycle clean litter is pushed into the storage area, causing substantial waste. Finally, the only access to the storage area is through the storage area lid. This makes maintenance of the cat box difficult, because the lid must be removed or otherwise gotten out of the way.

McDaniel (1993) in U.S. Pat. No. 5,226,388 further discloses that the rake retracts to its initial position against an end wall. A disadvantage of such a design is that it requires a very large force to move the rake back to its starting position, proximate to the end wall. If a rake enters a medium at an acute angle, there is a fundamental difference between forward raking and back raking. During forward raking, particles are pushed upward by the tines. The particles then fall back through the tines as the rake progresses. During back raking, the particles are pushed downward and are compressed by the tines. The rake must move through a compacted medium. The force required for back raking is thus much greater than for forward raking, assuming equal depth of forward and backwards raking. As litter becomes trapped between the end wall and rake, resistive forces grow large regardless of rake angle. This design requires a very large motor, reinforced structure and is subject to breakage.

OBJECTS AND ADVANTAGES

Accordingly, several objects and advantages of my invention are:

a) to provide a cat box which can be cleaned automatically;

b) to provide a cat box with a storage container for waste products so that maintenance of the box is minimized;

c) to provide a cat box with a drawer in the storage container to ease the removal of accumulated waste product;

d) to provide a cat box with a storage compartment seal so that odors do not escape;

e) to provide a cat box that will automatically clean its rake of waste, including those clumps which have stuck on and in between the tines;

f) to provide a cat box that will re-level the litter after each cycle;

g) to provide a cat box with a rake that retracts out of the litter tray after each usage;

h) to provide a cat box that requires a minimum of raking force;

i) to provide a cat box whose operation is reliable.

Still further objects and advantages will become apparent from a consideration of the ensuing description and drawings.

DRAWING FIGURES

FIG. 1A is an isometric view of the self-cleaning cat box.

FIG. 1B shows in detail the storage area lid front and scraper.

FIG. 1C is a side view of the cat box.

FIGS. 2A through 2F show in detail, the rake path during forward raking.

FIGS. 4C and 4D show the active lever arm orientation during forward and backward rake motion.

Figures 3A, 3B, 3C, 3D, 3E, 3F:
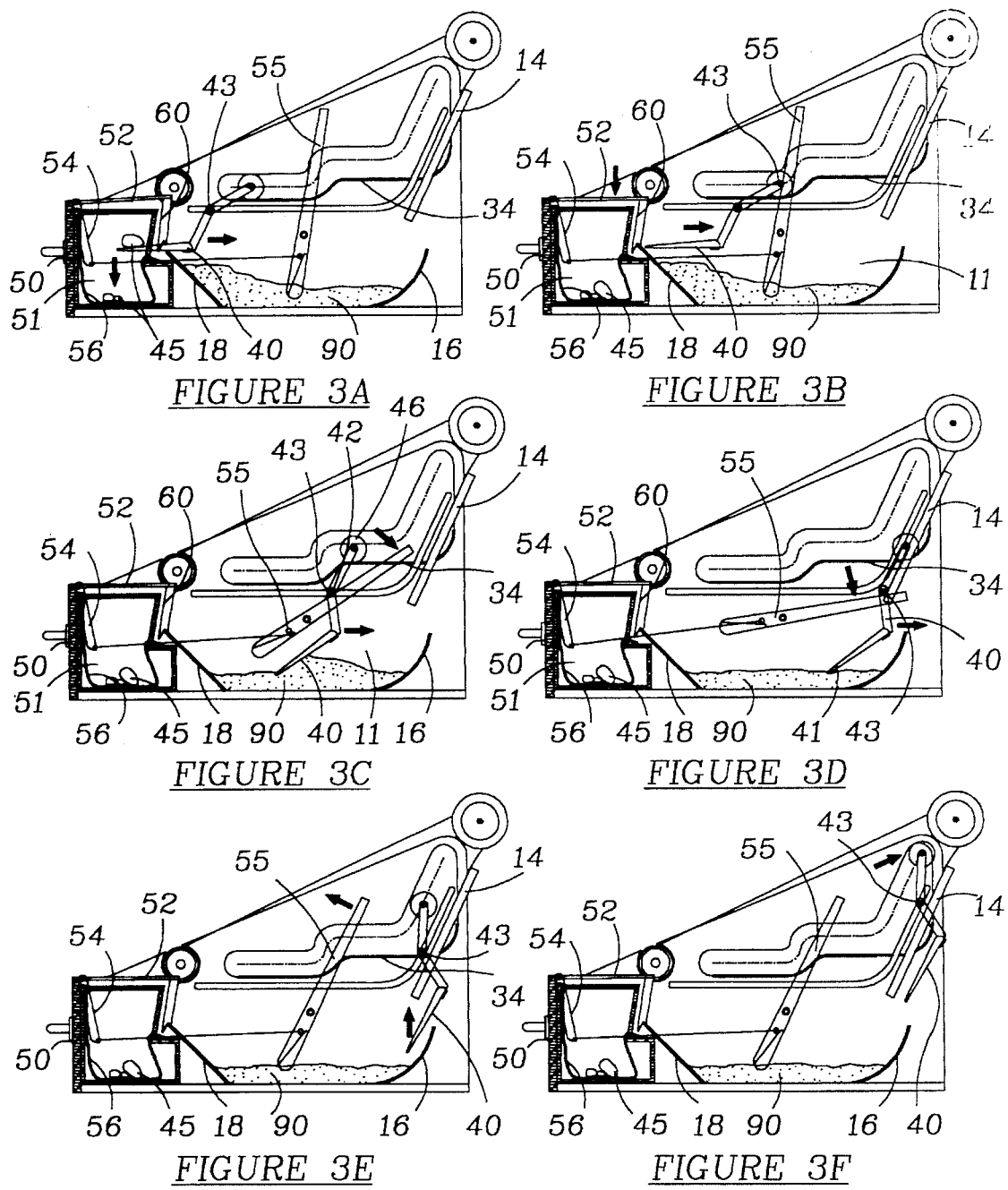
FIGS. 3A through 3F show in detail, the rake path during backward raking

| Reference Numerals in Drawings | |
|---|---|
| 11 litter tray | 50 drawer |
| 14 baffle | 51 storage area |
| 16 rear end wall | 52 lid |
| 18 front end wall | 53 front of lid |
| 20 side wall | 54 passive lid lever |
| 22 drive path | 55 active lid lever |
| 25 drive path curve | 56 bag |
| 27 drive path sloped section | 57 lever joining wire |
| 28 control path stop | 58 handle |
| 29 control path narrow section | 59 lid hinge |
| 30 control path | 60 scraper |
| 32 intersection, control and drive path | 61 scraper tines |
| 33 control path upper edge | 62 seal |
| 34 control path lower edge | 66 active lever hinge |
| 40 rake | 70 motor |
| 41 rake tines | 72 capstan |
| 42 axle | 73 capstan joining rod |
| 43 pin | 74 cable |
| 44 rake lever arm | 75 pulley |
| 45 waste | 90 litter |
| 46 follower | 92 oblique angle between rake and scraper |
| | 94 sloped lid front angle |

DESCRIPTION—FIGS. 1A, 1B, 1C, 4A, 4B

FIG. 1A shows a typical embodiment of the present invention. A litter tray 11 has a curved rear end wall 16, a sloped front end wall 18 (shown in FIG. 1C), and a pair of sidewalls 20. A baffle 14 is located at the rear of the cat box. In front of litter tray 11 is a storage area 51 with a lid 52 and a drawer 50. Drawer 50 has a handle 58.

Figure 4A:
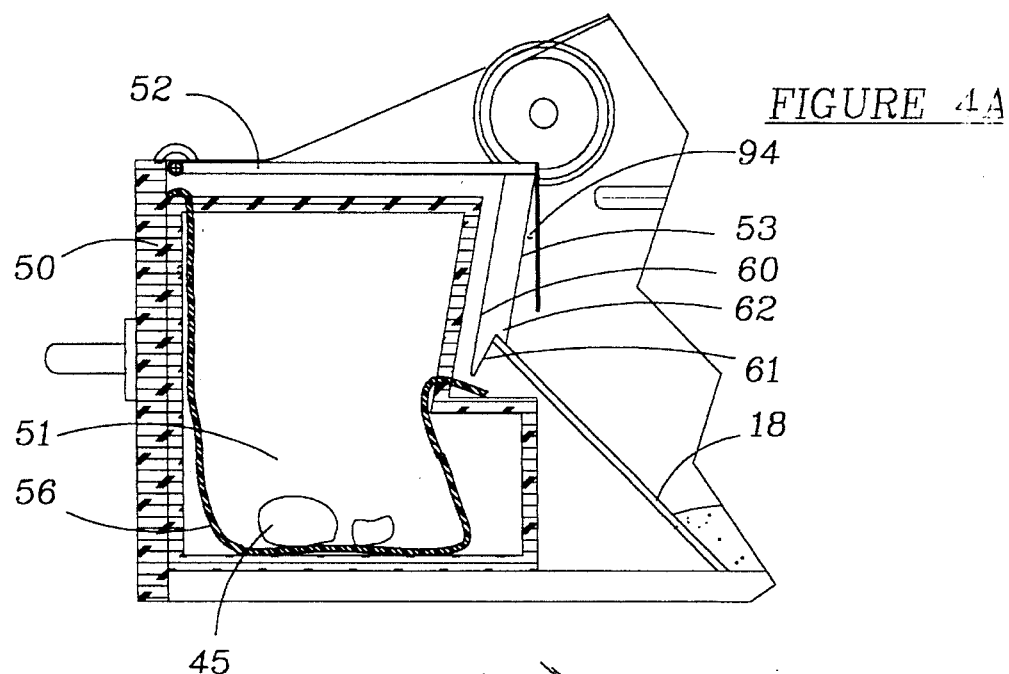
FIG. 4A is a side view of the storage area
Figure 4B:
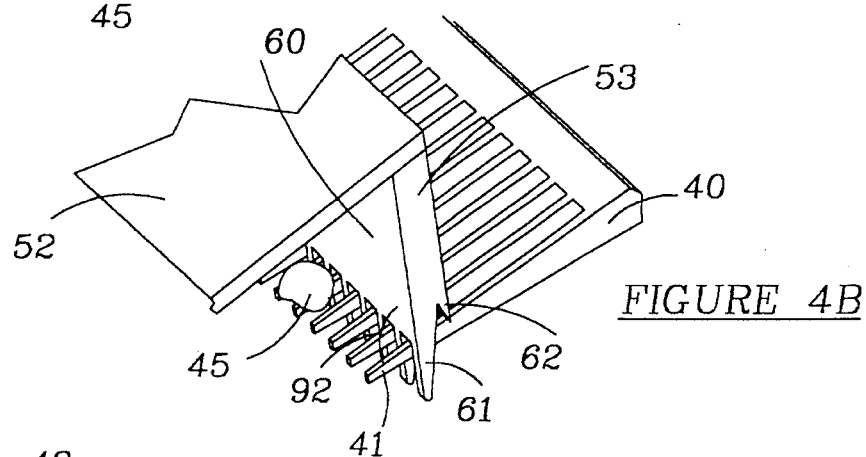
FIG. 4B is an isometric detail of the rake and scraper.

FIG. 1B shows in detail lid 52 with a sloped lid front 53 and a seal 62. The back of lid front 53 has a scraper 60 with scraper tines 61. As best seen in FIG. 4A, sloped lid front 53 slants away from vertical at an angle 94 which is 10°. This slant causes scraper 60 to intersect rake 40 at an oblique angle 92 as shown in FIG. 4B. Oblique angle 92 is 100°. As shown in FIG. 1C, storage area 51 extends under the front end wall 18. Drawer 50 fits inside of storage area 51. Drawer 50 is fitted with a bag 56, preferably of a disposable plastic type.

FIG. 1A further shows that the self-cleaning cat box has a rake 40 with a plurality of rake tines 41 which extend across the width of litter tray 11. The preferable distance between the tines is ¼". The tines are 0.10" thick and 5" long. Rake 40 is attached to a pair of axles 42, so that rake 40 can rotate freely. Axles 42 are ¼" in diameter. A rake lever arm 44 joins axle 42 to a follower 46 in a fixed angular relationship. The follower is a wheel with a diameter of 2". The weight distribution of rake 40, rake lever arm 44 and follower 46 is such that rake 40 will always rotate downward in the absence of any other forces acting on it.

Sidewalls 20 contain a pair of drive paths 22. Drive paths 22 are slots cut through side wall 20 through which axles 42 extend. The drive path shape consists of a horizontal section, a curved section 25 and a sloped section 27.

As best seen in FIG. 1C, the exterior of one side wall 20 also contains a control path 30. Control path 30 is a recessed area in the exterior of one side wall 20, with an upper edge 33 and a lower edge 34. FIG. 1A shows that control path 30 has a narrow section 29 with a width of 2.1", a stop 28 and wide section past stop 28. The width of the control path varies between a minimum of 2.10" and a maximum of 3.75". Toward the front of the cat box, drive path 22 and control path 30 are separated. Drive path 22 and control path 30 cross at an intersection 32. At the rear of cat box, drive path 22 and control path 30 overlap. To prevent follower 46 from entering drive path 22, the diameter of follower 46 is made larger than the width of drive path 22.

On one side of cat box, lid 52 is connected to a passive lid lever 54. Lid 52 can rotate about a pair of hinges 59. The passive lid lever 54 is connected to an active lid lever 55 by means of a lever joining wire 57. This wire is very flexible and is made of spring steel so that it returns to its original shape after being bent. Active lid lever 55 can freely rotate about its hinge point 66. Active lid lever 55 is weighted so that it will always return to a vertical position after being depressed. A pin 43 extends from axle 42.

A pair of stainless steel cables 74 are attached to a pair of capstans 72. The cables run over the top of sidewalls 20 and around pulleys 75. The cables run in a slot (not shown) cut into sidewall 20 just above the drive path 22. Cables 74 then are attached to axles 42 in such a manner that rake 40 is free to rotate but will be pulled in a linear direction by cables 44. Cables 44 then run in their slots around a control path curved section 25, up control path sloped section 27 and back to capstans 72 where they are again attached. 24" of extra cable is wrapped around each of capstans 72. Capstans 72 are rigidly joined to each other by a capstan joining rod 73 so that they rotate at the same speed. The capstans are connected to a reversible electric motor 70. Motor 70 has an integral gear box (not shown) so that the output rpm is 7.

Preferably, all components of the cat box, except motor 70, wire 57, cable 74 and electrical controls are made from an easily cleaned and inexpensive plastic type of material that can be mass produced at low cost.

OPERATION—FIGS. 1 to 4

In operation, litter tray 11 is filled to a depth of 2.5" with a clumping type of clay litter. When urine soaks into this litter, a hard clump is formed. . These clumps together with cat feces form waste 45 which can then be raked into the storage area. Two stripes (not shown) are painted on the inside of litter tray 11 to indicate the maximum and minimum levels that the litter needs to be maintained at, 0.5" and 3.0". A suitable power source is supplied to motor 70. Motor 70 is controlled by an electric or electronic switch (not shown) so that when a button (not shown) is pushed, motor 70 will cycle, moving rake 40 forward until rake 40 reaches its farthest limit over storage area 51, at which point a limit switch will reverse the polarity or phase of the motor causing the motor to reverse and the rake to retract to its original position. The cycling of the motor can also be under control of an electronic timer which would initiate the cleaning cycle at predetermined times.

Motor 70 rotates capstans 72 at 7 rpm so that the cleaning cycle will be completed in one minute. Each capstan 72 winds in and lets out cable as it is rotated. Capstan joining rod 73 connects both capstans so they rotate at exactly the same speed. As capstans 72 rotate, the cables connected to axles 42 are pulled, causing rake 40 to move. Because cable is let out and pulled in at exactly the same speed by both capstans, rake 40 moves parallel to sidewalls 20 preventing skewing and jamming. To further prevent jamming and breakdown, cables 74, pulleys 75, motor 70, capstans 72, and follower 46 are located above the litter tray, generally above drive path 22. Since the mechanical portion of the cat box is above litter tray 11, litter 90 cannot fall into the mechanism, increasing reliability.

FIGS. 2A through 2F shows the forward action of rake 40 during the cleaning cycle. Initially, rake 40 is parked in a position behind baffle 14, as shown in 2A. Baffle 14 prevents cats from soiling the rake, prevents litter from being thrown out the back of the box by the cat, and hides the rake from view. As shown in FIG. 2B, rake 40 moves from its parked position down into litter 90. The weight distribution of rake 40, causes rake 40 to rotate downward, enabling the tip of rake 40 to contact the litter within ⅛" of rear endwall 16. The frictional force of litter 90 causes the rake to rotate in a counter clockwise manner about axle 42. Follower 46 is pushed against the control path upper edge 33. Control path upper edge 33 thus controls the rotational orientation of rake 40 during forward motion.

FIG. 2C shows rake 40 moving forward at an angle of 50 degrees, with the tip of the rake tines ⅛" above the bottom of tray 11. The friction of rake 40 and force of the pushed waste 45 causes litter 90 to swell up in front of rake 40 in a wave motion as the rake 40 moves forward. As seen in FIG. 2D, follower 46 then contacts stop 28 which causes rake 40 to rotate along the front end wall 18. Pin 43 has contacts active lever arm 55. As the rake proceeds forward, pin 43 depresses active lever 55, pulling lever joining wire 57, which rotates passive lid lever 54 causing lid 52 to open.

Figure 4C:
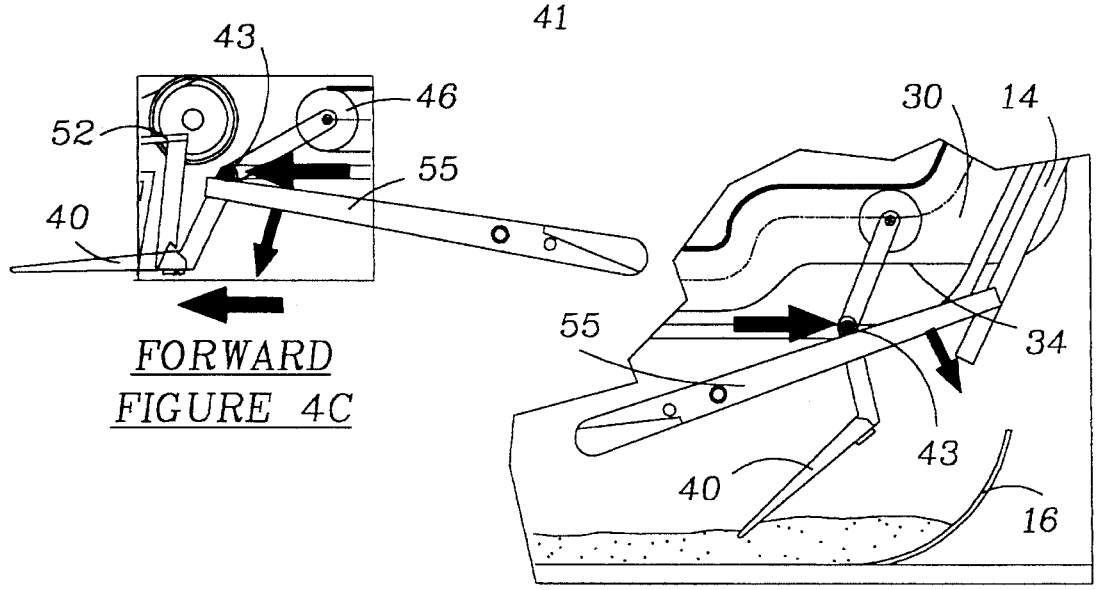

Rake 40 rotates to a horizontal position as seen in FIG. 2E. Waste 45 is now held by rake 40. Litter 90 has been pushed forward by the raking action and now comes up close to the top edge of front wall 18. About ¾ of litter 90 is in the front half of litter tray 11. Lid 52 is fully opened to a width 3" determined by the distance between the top edge of front end wall 18 and the bottom of lid front 53. FIG. 4C shows in detail that pin 53 has depressed active lid lever 55 and is just about to go past the end of active lid lever FIG. 2F shows that rake 40 has continued its forward motion, and in now in position over storage area 51. At the moment when rake 40 is fully extended over drawer 50, pin 53 goes past lid lever 55 and lid 52 falls downward. Scraper 60, attached to lid 52, falls on top of rake 40, trapping waste 45. Active lever arm 55 returns to its upright position. Simultaneously with tile dropping of lid 52, a limit detector (not shown) is depressed by rake 40, reversing the polarity of motor 70 and causing rake 40 to move in a backwards direction.

As rake 40 retracts, scraper 60 prevents waste 45 from leaving storage area 51. Waste 45 then falls off the end of rake 40. FIG. 3 A shows that some waste 45 has fallen into bag 56 as rake 40 is partially retracted. A large waste clump 45 remains on rake 40. Scraper 60 is contacting rake 40.

FIG. 4B shows in detail the action of scraper 60. As rake, 40 retracts, scraper 60 prevents waste 45 from leaving the storage area. Scraper tines 61 interlock with rake tines 41 to further remove any waste trapped between the rake tines. Scraper 60 intersects rake 40 at an oblique angle 92 which is 100°. This oblique scraper angle 92 causes scraper 60 to push upwards on waste 45, as well as scraping waste 45 off of rake 40. The upward component of force on waste 45 helps to lift waste 45 off of rake tines 41, and prevents the squishing of waste 45 into rake tines 41.

As seen in FIG. 3B, rake 40 is retracted out of storage area 51. All waste that was on rake 40 is now in bag 56. Scraper 60 slides off of rake 40 allowing lid 52 to drop further. FIG. 4A shows in detail the normally closed position of lid 52. Seal 62, which is a notch in the end of sloped lid front 53, has engaged the top edge of front end wall 18, preventing the escape of odor caused by waste 45. Lid front 53 is slanted from vertical by angle 94 which is 10°. At times, the cat will push and throw litter 90 against lid front 53. The slant of lid front 53 redirects this litter back into litter tray 11 and prevents the cat from piling litter over the entrance to storage area 51.

FIG. 3C shows that rake 40 back rakes litter 90 during retraction. When rake 40 contacts litter 90 during back raking, the frictional force causes rake 40 to rotate in a clockwise direction about axle 42. Follower 46 is pushed against the control path lower edge 34. Control path lower edge 34 controls the rotational orientation of rake 40 during back raking. The depth of forward raking is thus controlled independently from the depth of back raking, allowing rake 40 to gather waste during forward motion and smooth out litter during retraction.

As it retracts from storage area 51, rake 40 moves closely above the sloped front end wall 18 to move litter away from the top edge of front end wall 18 and storage area 51. As rake 40 moves backwards, litter 90 piles against the back rake 40 in the direction of travel. Rake 40 rakes backwards at a depth of 1.5" above the bottom of litter tray 11, smoothing litter 90. The force required for back raking is minimized because rake 40 is moving less litter than when forward raking. Further, rake 40 begins to lift out of tray 11 before the end of rake tines 41 have reached rear end wall 16. This prevents rake 40 from trapping litter 90 against rear end wall 16 and so further reduces the force needed for back raking. If the cat box has been overfilled with litter, the excess litter will be deposited near end wall 16 by the action retracting rake 40. As seen in detail in FIG. 4D, Pin 43 is depressing active lever arm 55 towards the rear of the cat box.

FIG. 3E shows rake 40 partially retracted out of litter 90. Pin 43 has passed the end of active lever arm 55 which is returning to its upright position. Litter 90 is leveled. The rake tines leave a pattern of parallel lines on the surface of the litter after back raking. These lines or their absence indicate to the cat owner if the cat box has been used and if the cleaning cycle needs to be initiated. FIG. 3F shows rake 40 in its parked position behind baffle 14 at the end of the cleaning cycle.

As seen best in FIG. 4A, bag 56 is held open in drawer 50. Drawer 50 extends under front end wall 18 to increase storage capacity. When bag 56 is full of waste, drawer 50 is opened, bag 56 is removed and discarded, and a clean bag reinstalled. Preferably, bag 56 is a plastic type of bag with a draw string, so that the full bag may be closed rapidly with the drawstring preventing the unwanted escape of unpleasant odors.

SUMMARY, RAMIFICATION, AND SCOPE

Accordingly, the reader will see that this invention can be used to automatically clean a cat-box and store the waste product for convenient removal. Furthermore, the cat box has the additional advantages in that it provides a means of scraping the rake clean after each usage, allowing for a cleaner environment and more storage area;

it provides a means to re-level the litter after each usage, which prevents the bottom of the tray from being exposed to soiling, and which minimizes the amount of clean litter which is discarded and allows the cat owner to see if the box has been used by the cat;

it provides a means of parking the rake out of the litter tray, which prevents the rake from being soiled by the cat and also reduces the force of back raking;

it provides a large storage compartment to minimize the frequency of maintenance;

it allows the storage compartment to be sealed to prevent unpleasant odors;

it provides a door in the storage compartment and a bag to ease the removal of waste;

it provides a simple means for opening and closing the storage area lid;

it provides a sloped storage lid front so that litter thrown and piled against lid front is redirected into the litter tray, reducing waste;

it allows the scraper and seal to be part of the storage lid and to be controlled by the action of the storage compartment lid, simplifying the control mechanism and reducing the number of discreet pans;

it keeps the mechanical system above the litter tray, minimizing the possibility that litter will work into the mechanism and thus improves reliability.

Although the description above contains many specificities, these should not be construed as limiting the scope of the invention but as merely providing illustration of some of the presently preferred embodiments of this invention.

For example, the litter tray can have a removable liner; the cat box can have an optional lid; to reduce friction, the axle can have a wheel mounted to it which would run in the drive path and be called a drive wheel; drive and control wheels can be pins that slide in a path, ball bearing wheels, plastic non-bearing wheels, metal or plastic slides, etc.; the control and drive paths can be slots in the side wall, grooves cut into metal or plastic, formed from wire, etc.; the drive cable can be made from wire, rope, flat cord, fishing line, etc.; the drive mechanism can be a pendulum arrangement with a long lever arm providing the drive path; the motor can be replaced by a hand crank for manual operation, the scraper can be separate from the lid; the scraper can have no tines; the lever joining wire can be string, cord, filament or thread of some suitable material such as nylon, polyester, cotton, etc..

Further variations are that the lid levers can be duplicated on both sides of the box; the lid can be controlled by electric solenoid or motor; the lid hinge can be a snap action type of hinge which would change the lid lever configuration; the control and drive paths can be on separate walls; the cable drive system can be replaced with a worm drive arrangement; cables can be replaced with timing belts which would allow the rake to move parallel to the side walls without capstans and a capstan joining rod; the control path can be one side only or on both sides of the cat box; the upper edge of the control path used for rake control during forward motion can be on one side wall, and the lower part of the control path can be on the other side wall; the drive path can be in the form of a complex loop, so that the axle or drive wheel would go forward along the lower part of the loop and return along the upper side of the loop.

Still further variations are that the rake can be made to move vertically just prior to moving over the storage area; vibration can be added to the rake or the box by electrical or mechanical means to further reduce raking friction; the operation of the cat box can be further automated so that the cleaning cycle is initiated by an electric or mechanical timing device; a hopper can be added which would automatically dispense litter with each cleaning cycle; the scraper angle and the angle of the sloped from of the hinge can be changed so that they were different from each other.

Undoubtedly, numerous variations and modifications of the invention will become readily apparent to those familiar with cat litter boxes. Thus the scope of the invention should be determined by the appended claims and their legal equivalents, rather than by the examples given.

I claim:

1. A self cleaning cat box comprising:

a tray for holding litter and a storage area;

a rake with pivotable tines movable through the litter;

means interacting with said rake so as to move said rake through litter, rotate said rake, and move said rake over said storage area;

in combination, a scraper and scraping means located over storage area for removing waste from said rake whereby said scraper comes down over waste while said rake is over said storage area and said scraper pulls the waste into said storage area as said rake retracts.

2. The self cleaning cat box of claim 1 further comprising leveling means to smooth the litter as said rake move backwards to its initial position and retracting means to lift said rake out of litter.

3. The self cleaning cat box of claim 1, wherein said litter tray further comprises a pair of side walls containing therein a pair of drive paths and a control path, and means interacting with said rake so that said drive paths control the longitudinal motion of said rake and said control path controls the rotational orientation of said rake, and said control path is of predetermined shape so that the depth of forward raking is controlled independently of the depth of backward raking.

4. The self cleaning cat box of claim 1 wherein said scraper further includes a plurality of tines of sufficient length and spacing to interlock with the tines of said rake and thereby remove waste stuck in the tines of said rake.

5. The self cleaning cat box of claim 1 wherein said storage area further comprises a storage compartment with a lid, and means interacting with said lid to open and close said lid so as to allow said rake to move over said storage area and close said storage area after retraction of said rake.

6. The self cleaning cat box of claim 5 wherein said storage compartment further includes a drawer that receives the waste, and means to open said drawer to permit easy disposal of said waste.

7. The self cleaning cat box of claim 5 wherein said storage compartment lid further comprises a seal and a means for sealing said storage compartment.

8. The self cleaning cat box of claim 1 wherein means for automatically moving said rake further comprises a reversible electric motor, a pair of capstans connected to said motor, and a pair of cables joined to said rake and to said capstans, said capstans rotating synchronously to let out and take in said cables thereby moving said rake and preventing skewing of said rake with respect to said side walls.

9. The self cleaning cat box of claim 1 wherein means for moving said rake further comprises a reversible electric motor, a pair of capstans connected to said motor, and a pair of cables joined to said rake and to said capstans, said capstans rotating synchronously to let out and take in said cables thereby moving said rake and preventing skewing of said rake with respect to side walls.

10. A method for cleaning solid waste from cat litter comprising the steps of:

moving a rake through a cat litter compartment so as to collect the solid waste;

abutting a portion of said rake while forward movement continues so as to rotate said rake to a horizontal position, maintaining the waste on said rake until said rake is positioned over a storage compartment;

placing a scraper on said rake so as to trap the solid waste;

retracting said rake under said scraper so that solid waste is deposited in said storage compartment.

11. A method of claim 10 further comprising the step of removing waste stuck between the pivotable tines of said rake through means of tines on said scraper which interlock with the tines on said rake and remove stuck waste as said rake retracts.

12. A self cleaning cat box comprising:

a tray for holding litter with a bottom, a pair of end walls and a pair of side walls, said side walls thereof containing a pair of drive paths and a control path a rake with pivotable tines movable through the litter;

means interacting with said rake so as to move said rake through the litter, rotate said rake, and move said rake over a storage area;

in combination, a scraper and scraping means located over the storage area for removing waste from said rake whereby said scraper comes down over waste while said rake is over said storage area and said scraper pulls the waste into said storage area as said rake retracts;

in combination with said control path, leveling means to smooth the litter as said rakes move backwards to its initial position.

13. The self cleaning cat box of claim 12 further comprising retracting means in combination with said drive path to lift said rake out of litter at the completion of a cleaning cycle.

14. The self cleaning cat box of claim 12, wherein said control path is of predetermined shape so that the depth of forward raking is controlled independently of the depth of backward raking.

15. The self cleaning cat box of claim 12 wherein said scraper further includes a plurality of tines of sufficient length and spacing to interlock with the tines of said rake and thereby scrape off waste from said rake and remove waste stuck in the tines of said rake as said rake retracts.

16. The self cleaning cat box of claim 12 wherein said storage area further comprises a storage compartment with a lid, and means interacting with said lid to open and close said lid so as to allow said rake to move over said storage area and seal said storage area after retraction of said rake.

17. The self cleaning cat box of claim 16 wherein said storage compartment further includes a drawer that receives the waste, and means to open said drawer to permit easy disposal of said waste.

18. The self cleaning cat box of claim 16 wherein said storage compartment lid further comprises a seal and a means for sealing said storage compartment.

19. The self cleaning cat box of claim 12 further comprising a baffle and means of hiding from view said rake when said rake is retracted out of said litter.

* * * * *